US012571416B2

(12) United States Patent　(10) Patent No.: US 12,571,416 B2
Brassel et al.　(45) Date of Patent: Mar. 10, 2026

(54) RIVETED JOINT

(71) Applicant: AUDI AG, Ingolstadt (DE)

(72) Inventors: Jan-Oliver Brassel, Bad Friedrichshall
(DE); Jörg Spindler, Überlingen (DE);
Jochen Rintelmann, Dessau (DE);
Patrick Siegmann, Neckarwestheim
(DE); Alexander Warkentin,
Langenbrettach (DE)

(73) Assignee: AUDI AG, Ingolstadt (DE)

( * ) Notice: Subject to any disclaimer, the term of this
patent is extended or adjusted under 35
U.S.C. 154(b) by 245 days.

(21) Appl. No.: 18/554,693

(22) PCT Filed: May 10, 2022

(86) PCT No.: PCT/EP2022/062529
§ 371 (c)(1),
(2) Date: Oct. 10, 2023

(87) PCT Pub. No.: WO2022/263058
PCT Pub. Date: Dec. 22, 2022

(65) Prior Publication Data
US 2025/0075718 A1　Mar. 6, 2025

(30) Foreign Application Priority Data

Jun. 16, 2021　(DE) ......................... 102021115577.0

(51) Int. Cl.
*F16B 5/04*　(2006.01)
*F16B 37/06*　(2006.01)
*B21J 15/02*　(2006.01)
(52) U.S. Cl.
CPC .............. *F16B 5/04* (2013.01); *F16B 37/065*
(2013.01); *F16B 37/068* (2013.01); *B21J*
*15/025* (2013.01)

(58) Field of Classification Search
CPC ......... B21J 15/025; F16B 5/0208; F16B 5/04;
F16B 19/06; F16B 19/086; F16B 19/10;
(Continued)

(56) References Cited

U.S. PATENT DOCUMENTS 4,825,527 A * 5/1989 Ladouceur ............ F16B 37/065
403/283
6,325,584 B1 * 12/2001 Marko ...................... F16B 5/04
411/501

(Continued)

FOREIGN PATENT DOCUMENTS

CN　102483084 A　5/2012
CN　112823067 A　5/2021
(Continued)

OTHER PUBLICATIONS

Office Action issued on Feb. 14, 2022, in corresponding German
Application No. 102021115577.0, 6 pages.
(Continued)

*Primary Examiner* — Josh Skroupa
(74) *Attorney, Agent, or Firm* — Maier & Maier, PLLC

(57) ABSTRACT

A riveted joint in which a rivet foot of a rivet element is
driven into a component with a setting force, in particular by
spreading the rivet foot. The rivet foot has a reduced
cross-section in the still undeformed state and has an
expanded cross-section in the driven-in state. The rivet foot
is designed as a bistable spring portion that has two equi-
librium states, namely the undeformed cross-section-re-
duced state and an expanded spread state. As a result of the
setting force being applied, the rivet element changes from
the undeformed state to the spread state, in which the rivet
foot is spread with an expanded cross-section in the com-
(Continued)

ponent, in particular without the build-up of a springback force that biases the rivet element towards the undeformed state.

19 Claims, 4 Drawing Sheets

(58) Field of Classification Search
CPC .... F16B 37/062; F16B 37/065; F16B 37/068; F16B 2019/1018; Y10T 403/49; Y10T 403/4949; Y10T 403/4966; Y10T 403/4974; Y10T 403/4991
USPC .......................... 403/274, 280, 282, 283, 285
See application file for complete search history.

(56) References Cited

U.S. PATENT DOCUMENTS

| | | | | |
|---|---|---|---|---|
| 7,425,111 | B2 * | 9/2008 | Ladouceur | F16B 37/068 |
| | | | | 411/181 |
| 10,252,317 | B2 * | 4/2019 | Babej | F16B 37/062 |
| 11,833,576 | B2 * | 12/2023 | Jones | B21J 15/025 |

| | | | |
|---|---|---|---|
| 2016/0361754 | A1 | 12/2016 | Schmidt |
| 2023/0400047 | A1 * | 12/2023 | Brassel ................. F16B 37/065 |
| 2024/0426330 | A1 * | 12/2024 | Brassel .................... F16B 5/04 |

FOREIGN PATENT DOCUMENTS

| | | | | |
|---|---|---|---|---|
| DE | 102005031916 A1 | | 3/2007 | |
| DE | 102013105335 A1 | | 11/2014 | |
| DE | 102014201976 A1 | | 8/2015 | |
| DE | 102015014941 A1 | * | 5/2017 | ............ B25J 15/025 |
| DE | 102018203114 A1 | | 9/2019 | |
| DE | 102018122200 A1 | | 3/2020 | |
| WO | WO-9535174 A1 | * | 12/1995 | ............ F16B 19/086 |
| WO | 2007132194 A1 | | 11/2007 | |
| WO | WO-2020025981 A1 | * | 2/2020 | ............ F16B 19/086 |

OTHER PUBLICATIONS

Office Action issued on Mar. 10, 2022, in corresponding German Application No. 102021115577.0, 4 pages.
International Search Report and Written Opinion issued on Sep. 12, 2022, in corresponding International Application No. PCT/EP2022/062529, 27 pages.
Office Action issued on Sep. 12, 2025, in corresponding Chinese Application No. 202280034486.3, 14 pages.

* cited by examiner

RIVETED JOINT

FIELD

The invention relates to a riveted joint.

BACKGROUND

In such a riveted joint, a rivet foot of a rivet element is driven into a component with a setting force while maintaining a residual bottom thickness in the component and while spreading open the rivet foot. The cross-section of the rivet foot is reduced in the still undeformed state. When driven in, the rivet foot has an expanded cross-section.

In the prior art, such a riveted joint is created in a riveting process in which the rivet element has an expanded rivet head and a rivet foot with an open inner curvature at the rivet foot tip. In a setting operation, the pilot hole-free component is clamped between a die and a downholder of a setting device. The rivet element is driven in with a predefined setting force, causing the rivet foot tip to expand radially outward over a spreading distance. This results in an undercut between the rivet head and the expanded rivet foot, which is filled with component material. In particular, the rivet foot tip is form-fittingly enclosed by the component material. This prevents relative movement, for example caused by springback of the rivet foot after spreading, because this would require deformation of the component.

When using component material with low ductility, for example aluminum die casting, such form-fitting enclosing of the rivet foot tip is only possible to a limited extent, so that springback of the rivet foot (after spreading) occurs after the setting process. Therefore, the rivet element is not sufficiently secured against loosening. In addition, component material with low ductility is at risk of notching, which can lead to premature component cracking or fracture.

A joint connection is known from DE 10 2018 122 200 A1. A punch riveting process is known from WO 95/35174 A1. A method for producing a joint between a functional element and a plate-shaped component is known from DE 10 2015 014 941 A1.

SUMMARY

The object of the invention is to provide a riveted joint in which the rivet element is secured in a simple manner against unintentional loosening from the component.

The invention is based on a riveted joint, in which a rivet foot of a rivet element is driven into a component with a setting force while maintaining a residual bottom thickness in the component and while spreading open the rivet foot. The cross-section of the rivet foot is reduced in the still undeformed state. On the other hand, when the rivet is driven in, the rivet foot has an expanded cross-section.

According to the characterizing part of claim 1, in contrast to a conventional punch riveting process, a form-fitting enclosing of the expanded rivet foot tip is dispensed with. Instead, in order to secure the rivet element to the component, the following principle is applied: the rivet foot forms a bistable spring portion with two equilibrium states. A first equilibrium state corresponds to the reduced cross-section, undeformed rivet foot state. When the setting force is applied, the rivet foot changes to the second equilibrium state, in which the rivet foot is spread in the component with an expanded cross-section. The changeover to the spread state takes place essentially without the buildup of a spring-back force that biases the rivet element toward the undeformed state.

According to the invention, the deformation of the rivet element in the setting process is therefore carried out using the so-called spring buckle effect (also known as the clicker frog effect). The spring buckle effect is a physical effect in which the shape of the rivet element has two stable states, into which the element can be transferred by the application of a suitable force.

In a technical implementation, the component may not be formed completely free of pilot holes in the undeformed state, but rather have a pilot hole at the joint to be produced. In the assembled state, the rivet foot of the rivet element is spread against the inner circumference of the pilot hole.

The rivet element can be rotationally symmetrical with respect to a rivet element longitudinal axis. In addition, the rivet element may have an expanded rivet head that merges into the rivet foot in the axial direction. Another functional element, for example a screw bolt, may also be formed on the upper side of the rivet head. According to the invention, the rivet foot can be divided into a head-side rivet foot solid material portion and an adjoining inner curvature. This curvature is open towards the rivet foot tip and ends at a ring-shaped setting edge. The inner curvature is bounded by a circumferential rivet foot wall, which merges into the rivet foot solid material portion in a uniform and integral manner. In this case, the rivet foot wall can form the bistable spring portion. In the spread state, the rivet foot wall can be folded over against the setting direction, namely in the direction of the rivet head. In this case, the touchdown edge may be in spreading engagement with the inner circumference of the component pilot hole. In addition, the rivet foot wall surrounds the rivet foot solid material portion in a dish-shaped manner and without interruption, namely continuously, in the circumferential direction.

In one technical embodiment, the component may be a casting, for example an aluminum die casting, while the rivet element may be made of a cold forming material. In this particular case, it is preferable for the component to be stressed during the setting process essentially without plastic deformation, namely in particular only elastically. Particularly preferably, the component can remain largely undeformed after the setting process has been completed.

In order to achieve a perfect transfer of the rivet element from the undeformed state to the spread state, it is advantageous if the component pilot hole has a corresponding activation contour. The activation contour can be used to reliably transfer the rivet element from the undeformed state to the second spread state during the setting process. In a preferred embodiment, the component pilot hole may have the following geometry: the component pilot hole can be formed as a blind hole with a closed bottom. The blind hole may have a large-diameter insertion portion. This merges into a small-diameter counterbore at a circumferential annular shoulder. The setting edge of the still undeformed rivet element can be on a diameter larger than the inner diameter of the annular shoulder. This allows the rivet element (in preparation for the setting process) to be positioned with its setting edge on the annular shoulder of the component pilot hole.

When the setting force is applied, the rivet element can expand radially outward with its setting edge until it reaches a maximum outer diameter. As the setting process continues, the rivet foot solid material portion can be driven into the pilot hole counterbore by an additional stroke distance beyond the dead center. This results in over-deforming or over-spreading the rivet foot, during which the rivet foot changes to the spread state.

Preferably, the rivet element can be made of a cold-forming material in which, in particular, a forming limit is exceeded during overspreading, at which point a consolidation of the rivet element material occurs that is advantageous in terms of increased joint strength between the rivet element and the component. According to the invention, it is therefore possible to dispense with a die, the shape of which supports spreading of the rivet foot. Instead, the component can be clamped between a downholder and a flat anvil.

The setting process according to the invention can be part of a fully automated process chain in which a setting device is attached to the distal end of a robot arm of an industrial robot that operates autonomously by means of a program control. To ensure a proper setting process, it is preferable if the rivet foot outer diameter is smaller than the annular shoulder outer diameter. In this way, the still undeformed rivet element can be positioned with its setting edge in floating support, namely with transverse play, on the annular shoulder, whereby component tolerances and/or manufacturing tolerances can be compensated.

When using a die-cast part, the component pilot hole can be created in the component surface during the casting process. In this case, the component pilot hole may have a conical inner circumference that serves as a draft chamfer. The conical inner circumference also acts as an insertion chamfer during the setting process to ensure proper positioning of the rivet element on the annular shoulder of the component pilot hole.

BRIEF DESCRIPTION OF THE FIGURES

An exemplary embodiment of the invention is described in the following by means of the appended figures.

In particular.

DETAILED DESCRIPTION

Figure 5:
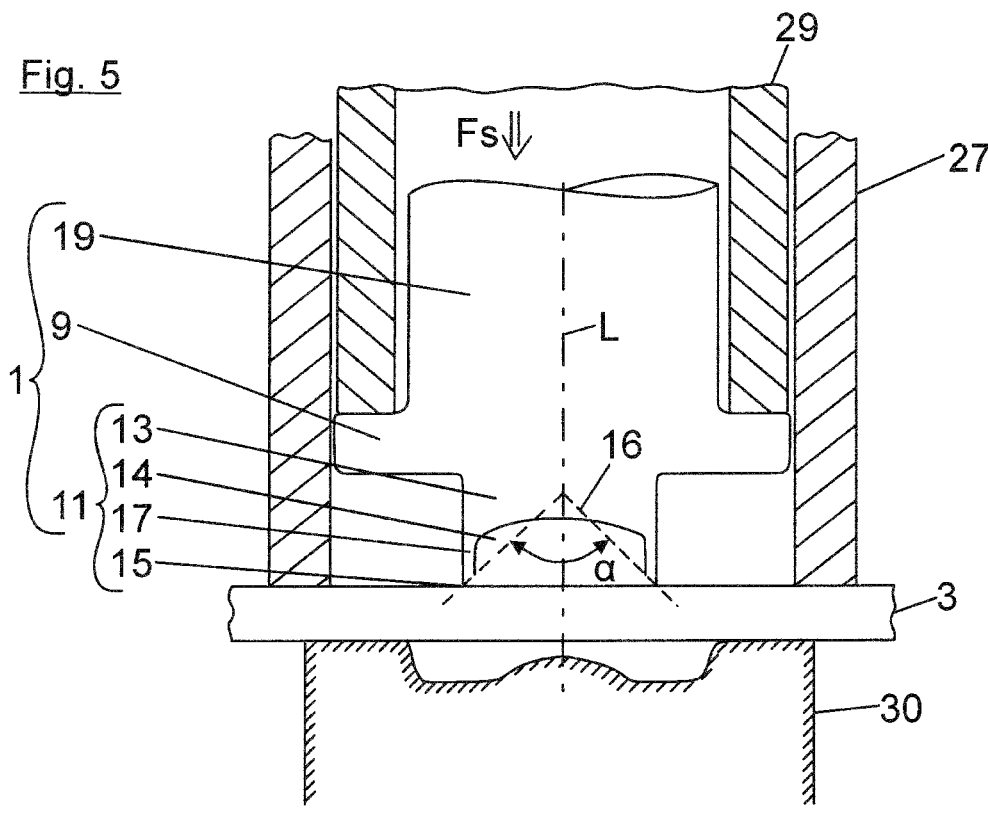
FIG. 5 shows a comparative example not encompassed by the invention.
Figure 6:
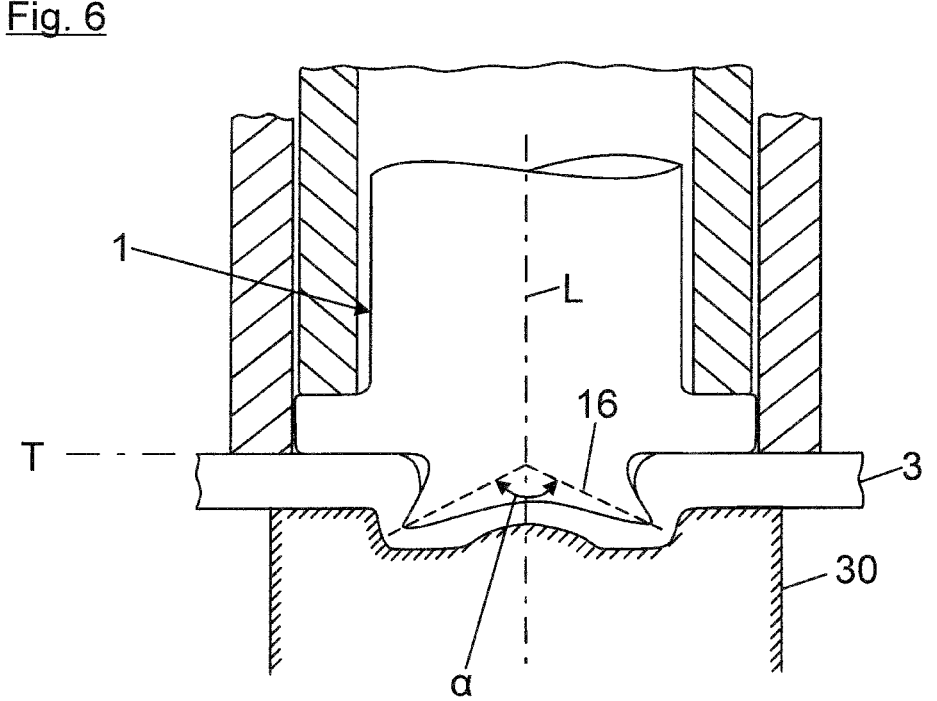
FIG. 6 shows a comparative example not encompassed by the invention.

For a simpler understanding of the invention, reference is first made to FIGS. 5 and 6, by means of which a riveted joint known in the prior art is described. The riveted joint shown in FIG. 5 consists of a rivet element 1 and a component 3. The rivet element 1 has a rotational symmetry with respect to the rivet element longitudinal axis L. In addition, the rivet element 1 has a expanded rivet head 9 that merges into a rivet foot 11 in the axial direction. The rivet foot 11 is divided into a head-side rivet foot solid material portion 13 and an adjoining cylindrical rivet foot wall 17, which terminates at an annular setting edge 15 and delimits an inner curvature 14 open at the rivet foot tip.

The setting process is carried out with the aid of a setting tool, which in FIG. 5 or 6 comprises a downholder 27, a setting piston 29 and a die 30. The die contour is designed in such a way that spreading of the rivet foot 11 radially outward is supported during the setting process. During a setting process, the pilot hole-free component 3 is clamped between the die 30 and the downholder 27. The rivet element 1 is driven in by the setting piston 29 with a predefined setting force $F_S$, causing the rivet foot tip to expand radially outward over a spreading distance. The setting force $F_S$ introduced into the rivet element 3 splits into load paths at a vertex above the inner curvature 14, which paths extend along imaginary (dashed) spreading lines 16 in FIG. 5 or 6. The spreading lines 16 form a spreading angle α. During the setting process (FIG. 6), the rivet element 1 is driven in by a setting stroke to a bottom dead center T (FIG. 6). At bottom dead center T, the front face of the rivet foot tip is in contact with the component material and the spread angle α is increased (compared to FIG. 5). This results in an undercut between the rivet head 9 and the expanded rivet foot tip, which undercut is filled with component material.

In the setting process, the rivet element 1 is not only plastically but also elastically deformed, by generating a restoring force that biases the rivet element 1 towards the undeformed state. To prevent springback to the undeformed state, the rivet foot tip is form-fittingly surrounded by component material in FIG. 6. This prevents relative movement, for example caused by springback of the rivet foot 11 after spreading, because this would require deformation of the component 3. In this way, the rivet element 1 is reliably secured against loosening. In order to achieve such a form-fitting enclosure of the rivet foot tip by means of the component material, a sufficiently high flowability or ductility of the component material is required.

Figure 1:
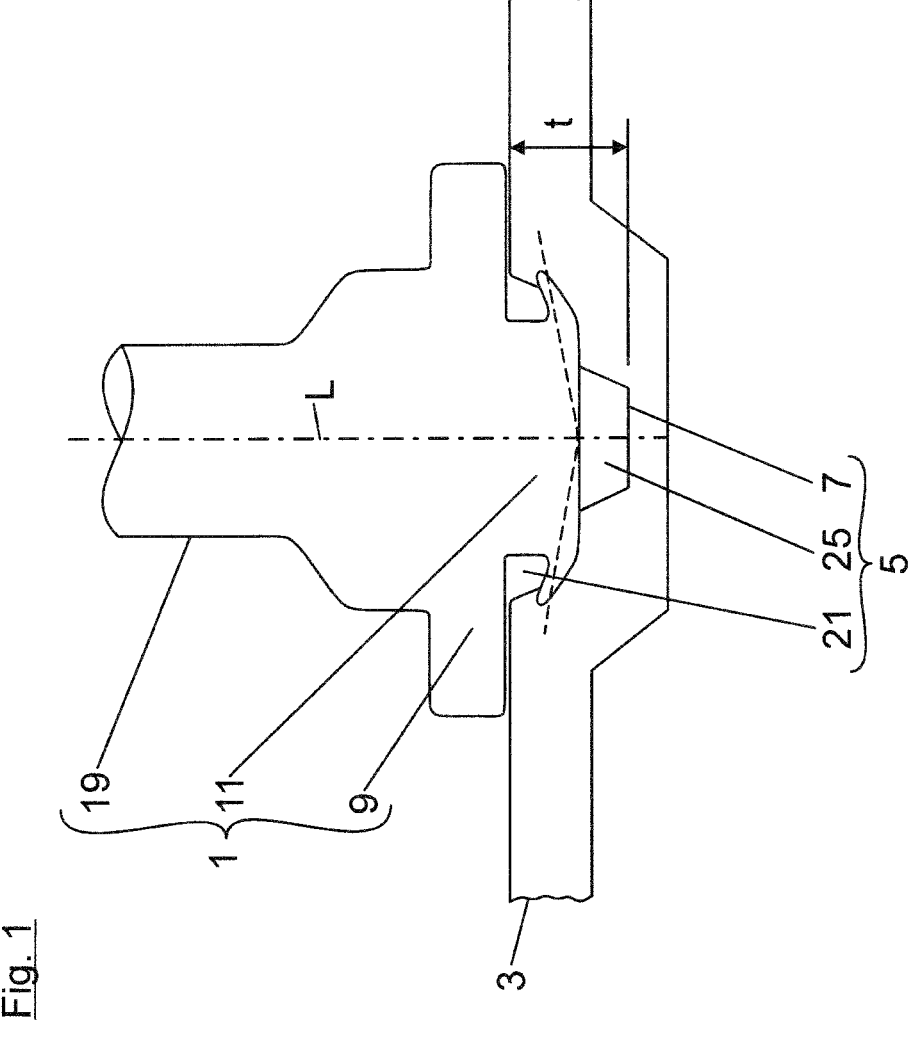
FIG. 1 shows a riveted joint in a transverse sectional view.
Figure 4:
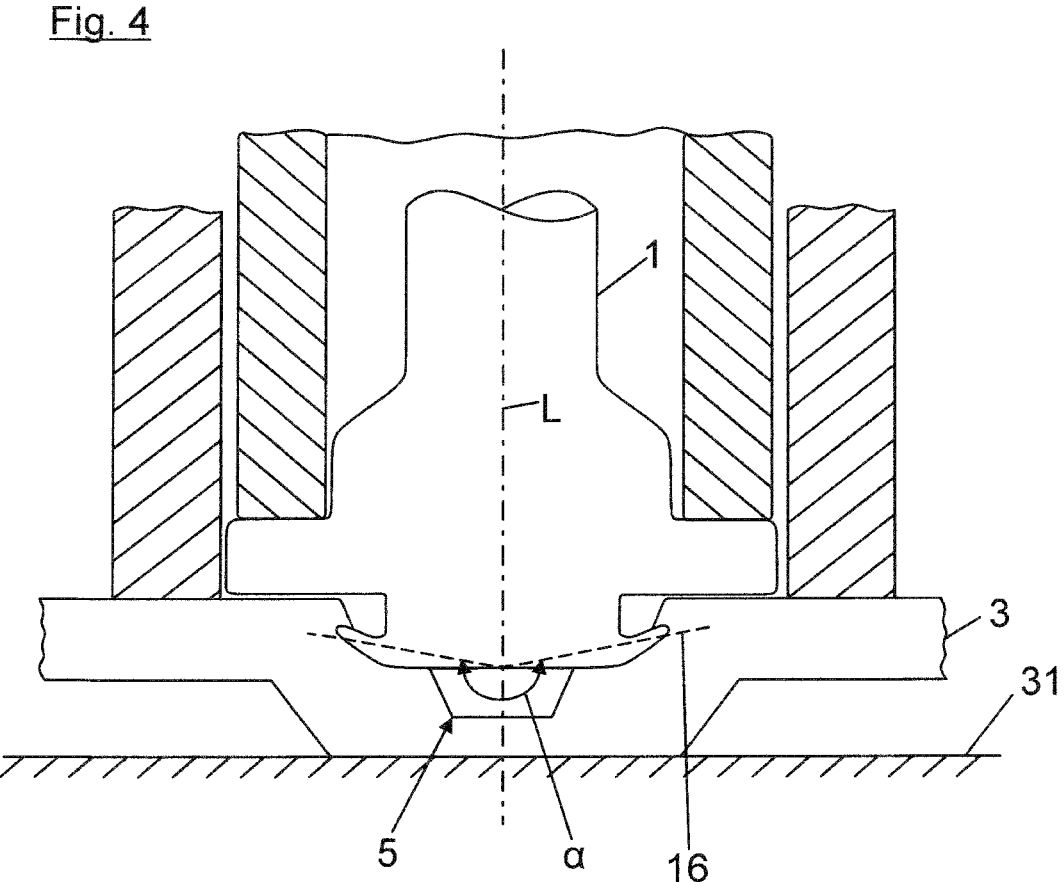
FIG. 4 shows a view based on which process steps for producing the riveted joint is illustrated.

In a departure from this, the riveted joint according to the invention can also be realized with a component 3, the flowability or ductility of which is reduced compared with the prior art. In fact, according to the invention, the rivet element 3 is not secured by form-fitting enclosure of the rivet foot tip by means of the component material, but by means of the securing mechanism described below:

According to FIG. 1, the rivet element 1 is driven into a component pilot hole 5, which conically extends up to a pilot hole depth t and terminates there with a pilot hole bottom 7. The essence of the invention is that the rivet foot 11 acts as a bistable spring portion. This portion has two equilibrium states, namely the undeformed cross-section-reduced state (FIG. 2) and an expanded spread state (FIG. 1 or 4). The setting force $F_S$ causes the rivet element 1 to transition from the undeformed state (FIG. 2) to the expanded state, in which the rivet foot 11 with the expanded cross section is spread in the component 3. The spread state (FIG. 1 or 4) is characterized by the fact that (in contrast to the prior art) essentially no springback force is built up, which biases the rivet element 1 toward the undeformed state. According to the invention, it is therefore possible to dispense with a form-fitting enclosing of the rivet foot tip by the component material.

Figures 2, 3:
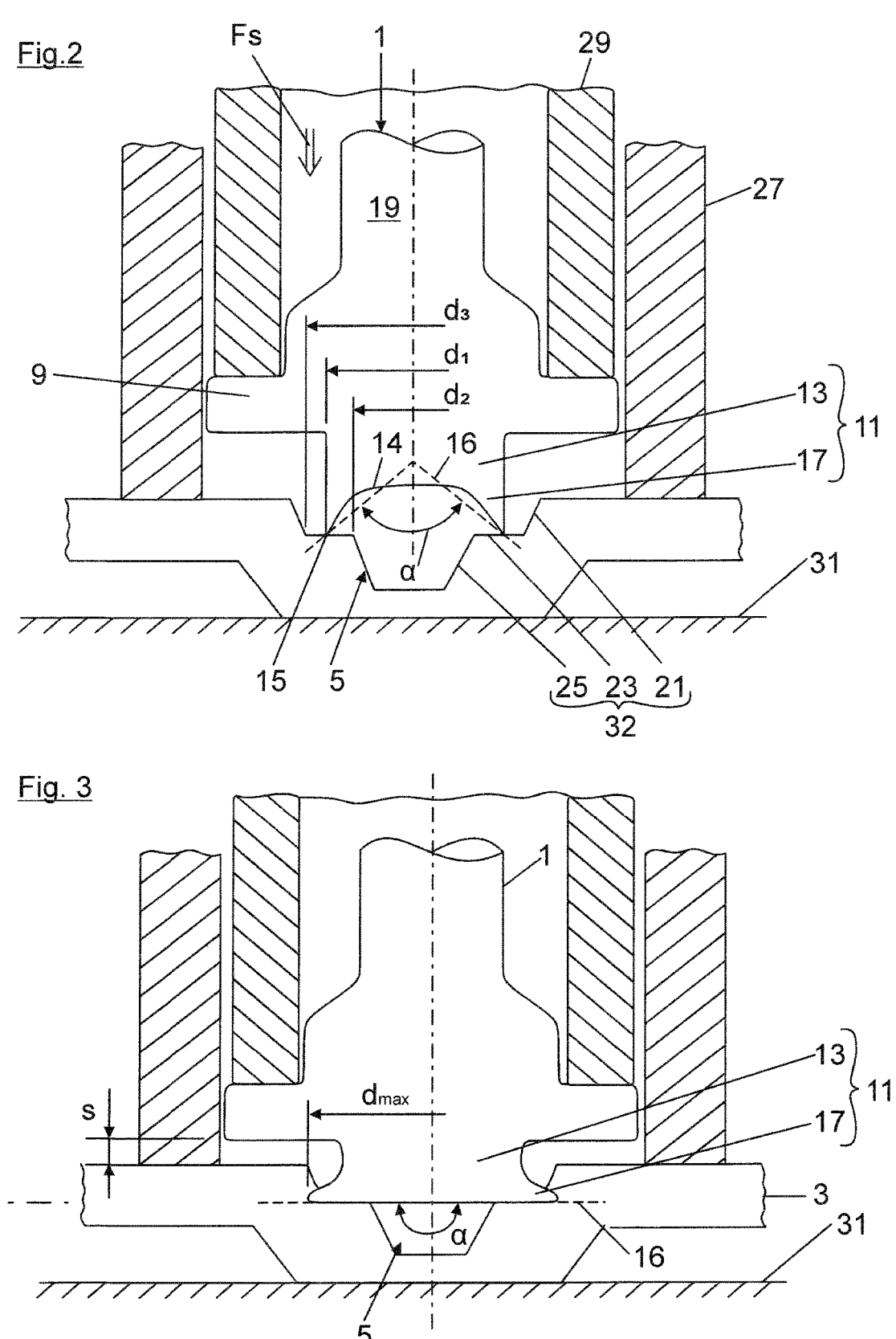
FIG. 2 shows a view based on which process steps for producing the riveted joint is illustrated.
FIG. 3 shows a view based on which process steps for producing the riveted joint is illustrated.

FIGS. 2 to 4 describe the pilot hole geometry of component 3, the rivet element geometry and the setting process according to the invention: according to FIG. 2, the still undeformed rivet element 1 is rotationally symmetrical with respect to its longitudinal axis L. In FIG. 1, the rivet foot 11 is divided into a head-side rivet foot solid material portion 13 and an adjoining inner curvature 14, which is open at the rivet foot tip. The inner curvature 14 terminates at an annular surrounding setting edge 15 of the rivet element 1. The inner curvature 14 is also bounded by a circumferential rivet foot wall 17, which merges into the rivet foot solid material portion 13 in a uniform and integral manner. In the figures, a functional portion 19, for example a screw bolt, is formed on the upper side of the rivet head 9.

The folding over of the rivet foot wall 11, which acts as a bistable spring portion, is supported by means of a special activation contour 32 (FIG. 2) in the component pilot hole 5, which is designed as follows: the component pilot hole 5 in FIG. 2 has a large-diameter insertion portion 21. In the direction of the pilot hole bottom 7, this portion transitions step-wise at a circumferential annular shoulder 23 into a small-diameter pilot hole counterbore 25. When the rivet element 1 is still undeformed, the setting edge 15 extends at a diameter $d_1$ that is larger than the inner diameter $d_2$ of the annular shoulder 23. In addition, the outer diameter of the rivet foot is smaller than the outer diameter $d_3$ of the annular shoulder.

The setting process is carried out with a setting tool which, in FIG. 3, has the downholder 27 in which a setting piston 29 is guided in a stroke-adjustable manner. The component 3 is clamped between the downholder 27 and a flat mating contour 31. In contrast to the die 30 known from the prior art (FIGS. 5 and 6), the mating contour 31 does not have a special contour for supporting a spreading movement of the rivet foot 11, but rather has a flat design. Also, no deformation of the component 3 occurs, as is the case in the prior art shown in FIGS. 5 and 6. In FIG. 3, the rivet element 1 is supported by its setting edge 15 on the annular shoulder 23 in the component pilot hole 5. When the setting force $F_S$ is applied, the rivet foot 11 expands radially outward with its setting edge 15 until a setting stroke dead center T is reached (FIG. 3). At the setting stroke dead center T, the setting edge 15 of the rivet element 1 is expanded to a maximum diameter $d_{max}$ and is in spreading engagement with the inner circumference of the large-diameter insertion portion 21 of the component pilot hole 5. In addition, the front face of the rivet foot tip is in contact over a large area with the annular shoulder 23. Furthermore, at the setting stroke dead center T (FIG. 3), the spreading angle $\alpha$ formed by the spreading lines is approximately 180°.

According to the invention, the setting stroke is extended beyond the dead center T by a stroke distance s (FIG. 3). In the further course of the setting process, the rivet foot solid material portion 13 is therefore driven into the pilot hole counterbore 25 beyond the dead center by the stroke distance s. This results in an over-forming or over-spreading of the rivet foot wall 17, in which the rivet foot wall 17 changes to the spread state. In the spread state, the spreading angle $\alpha$ formed by the spreading lines 16 is increased to about 200° (compared to the setting stroke dead center T of FIG. 3). The rivet foot wall 17 is therefore folded against the setting direction, namely in the direction of the rivet head 9. The folded over rivet foot wall 17 extends continuously as well as in a dish-like manner in the circumferential direction around the rivet foot solid material portion 13 of the rivet element 1.

As can be seen from FIG. 2, the inner circumference of the large-diameter insertion portion 21 of the component pilot hole 5 is conical so that the inner circumference acts as an insertion slope by means of which smooth insertion of the rivet element 1 into the component pilot hole 5 is enabled. In addition, the rivet element 1 is positioned on the annular shoulder 23 in floating support (FIG. 2), namely positioned with transverse play, whereby component tolerances and/or manufacturing tolerances can be compensated.

LIST OF REFERENCE NUMERALS

1 rivet element
3 component

5 pilot hole
7 pilot hole bottom
9 rivet head
11 rivet foot
13 rivet foot solid material portion
14 inner curvature
15 setting edge
16 spreading lines
17 rivet foot wall
19 functional portion
21 large-diameter insertion portion
23 annular shoulder
25 pilot hole counterbore
27 downholder
29 setting piston
30 die
31 flat mating contour
32 activation contour in the component pilot hole
t pilot hole depth
$d_1$ setting edge diameter
$d_2$ annular shoulder inner diameter
$d_3$ annular shoulder inner diameter
$F_S$ setting force
$d_{max}$ maximum diameter
T dead center
s stroke distance beyond the dead center
l rivet element longitudinal axis
$\alpha$ spreading angle

The invention claimed is:

1. A riveted joint, comprising:
a rivet foot of a rivet element; and
a component;
wherein, during a setting process, the rivet foot is driven into the component with a setting force, such that the rivet foot is spread radially outward during the setting process;
wherein the rivet foot has a reduced cross-section in an undeformed state and an expanded cross-section in a driven-in, spread state;
wherein at least a portion of the rivet foot comprises a bistable spring portion having two equilibrium states, a first equilibrium state being the undeformed state and a second equilibrium state being the spread state;
wherein, as a result of the action of the setting force, the rivet element transitions from the first equilibrium state to the second equilibrium state;
wherein, when the rivet foot is spread in the component with the expanded cross-section, the rivet foot is in the second equilibrium state; and
wherein, in the second equilibrium state, a build-up of a springback force, which biases the rivet element in the direction of the undeformed state, is not present within the rivet element.

2. The riveted joint according to claim 1, wherein:
the component, in an undeformed state thereof, has a pilot hole at a location of the riveted joint to be produced; and
in the riveted joint, the rivet foot of the rivet element is spread against an inner circumference of the pilot hole.

3. The riveted joint according to claim 2, wherein:
the rivet element is rotationally symmetrically with respect to a rivet element longitudinal axis;
the rivet element has an expanded rivet head which merges into the rivet foot in an axial direction;
the rivet foot is divided into a head-side rivet foot solid material portion and an adjoining cylindrical rivet foot wall that terminates at an annular circumferential setting edge and delimits an inner curvature open at the rivet foot tip; and the rivet foot wall forms the bistable spring portion.

4. The riveted joint according to claim 3, wherein, in the spread state of the rivet element:

the rivet foot wall is folded over in a direction opposite the setting direction and in a direction of the rivet head;

the rivet foot wall extends around the rivet foot solid material portion in a dish shape; and the setting edge is in spread engagement with the inner circumference of the pilot hole of the component.

5. The riveted joint according to claim 4, wherein the pilot hole of the component has an activation contour which, in the setting process, assists in transferring the rivet element from the undeformed state to the spread state.

6. The riveted joint according to claim 4, wherein:

the pilot hole of the component is a blind hole with a closed bottom;

for the formation of the activation contour, the blind hole has a large-diameter insertion portion which, at a circumferential annular shoulder, merges in a step-wise manner into a small-diameter counterbore; and the setting edge of rivet element in the undeformed state lies on a diameter which is larger than the inner diameter of the annular shoulder, so that, in preparation for the setting process, the setting edge of the rivet element is positionable on the annular shoulder of the pilot hole.

7. The riveted joint according to claim 4, wherein, during the setting process, the rivet element deforms plastically, while the component is substantially elastically stressed without plastic deformation and remains substantially undeformed.

8. The riveted joint according to claim 3, wherein the pilot hole of the component has an activation contour which, in the setting process, assists in transferring the rivet element from the undeformed state to the spread state.

9. The riveted joint according to claim 3, wherein:

the pilot hole of the component is a blind hole with a closed bottom;

for the formation of the activation contour, the blind hole has a large-diameter insertion portion which, at a circumferential annular shoulder, merges in a step-wise manner into a small-diameter counterbore; and the setting edge of rivet element in the undeformed state lies on a diameter which is larger than the inner diameter of the annular shoulder, so that, in preparation for the setting process, the setting edge of the rivet element is positionable on the annular shoulder of the pilot hole.

10. The riveted joint according to claim 3, wherein, during the setting process, the rivet element deforms plastically, while the component is substantially elastically stressed without plastic deformation and remains substantially undeformed.

11. The riveted joint according to claim 2, wherein the pilot hole of the component has an activation contour which, in the setting process, assists in transferring the rivet element from the undeformed state to the spread state.

12. The riveted joint according to claim 11, wherein:

the pilot hole of the component is a blind hole with a closed bottom;

for the formation of the activation contour, the blind hole has a large-diameter insertion portion which, at a circumferential annular shoulder, merges in a step-wise manner into a small-diameter counterbore; and the setting edge of rivet element in the undeformed state lies on a diameter which is larger than the inner diameter of the annular shoulder, so that, in preparation for the setting process, the setting edge of the rivet element is positionable on the annular shoulder of the pilot hole.

13. The riveted joint according to claim 2, wherein:

the pilot hole of the component is a blind hole with a closed bottom;

for the formation of the activation contour, the blind hole has a large-diameter insertion portion which, at a circumferential annular shoulder, merges in a step-wise manner into a small-diameter counterbore; and the setting edge of rivet element in the undeformed state lies on a diameter which is larger than the inner diameter of the annular shoulder, so that, in preparation for the setting process, the setting edge of the rivet element is positionable on the annular shoulder of the pilot hole.

14. The riveted joint according to claim 13, wherein:

during a setting stroke, the rivet element drivable into the component pilot hole up to a dead center;

at the dead center, the setting edge of the rivet element is expanded radially outwards up to a maximum diameter;

the rivet foot tip is in surface contact with the annular shoulder of the pilot hole;

the setting stroke is extended by a stroke distance beyond the dead center, such that the rivet foot solid material portion is driven into the pilot hole counter-bore, and such that an over-spreading of the rivet foot wall is effectuated; and the rivet foot wall transitions to the spread state during the over-spreading of the rivet foot wall.

15. The riveted joint according to claim 13, wherein an outer diameter of the rivet foot is dimensioned smaller than an outer diameter of the annular shoulder, so that the setting edge of the undeformed rivet element is positionable in floating support on the annular shoulder.

16. The riveted joint according to claim 2, wherein the inner circumference of the pilot hole of the component has a conical insertion slope.

17. The riveted joint according to claim 2, wherein, during the setting process, the rivet element deforms plastically, while the component is substantially elastically stressed without plastic deformation and remains substantially undeformed.

18. The riveted joint according to claim 1, wherein, during the setting process, the rivet element deforms plastically, while the component is substantially elastically stressed without plastic deformation and remains substantially undeformed.

19. The riveted joint according to claim 1, wherein:

the component is a casting;

the rivet element is made of a cold-forming material in which, in the case of over-spreading, a forming limit is exceeded; and a consolidation of the rivet element material occurs above the forming limit.

* * * * *